April 24, 1956          D. LOUIE          2,742,836

CAMERA SHUTTER TRIPPING ATTACHMENT

Filed March 21, 1955

INVENTOR.
DON LOUIE

BY *J. E. Trabucco*

ATTORNEY

United States Patent Office 2,742,836
Patented Apr. 24, 1956

2,742,836

CAMERA SHUTTER TRIPPING ATTACHMENT

Don Louie, Palo Alto, Calif.

Application March 21, 1955, Serial No. 495,421

2 Claims. (Cl. 95—53)

This invention relates to photographic apparatus and more particularly to a novel device for controlling the operation of a camera shutter or the film exposing mechanism of a moving picture camera.

The present invention provides a novel camera attachment which makes it possible to operate the film exposing mechanism of a camera by remote control. The control mechanism embodying the present invention is adapted to be mounted on the side of a camera in operative relationship with the adjustable switch arm or other device which operates the camera shutter or the film exposing means. The present invention makes it possible for a person to position himself at a remote distance from a camera and by pulling on a cord leading to a control member or other device, cause the exposure of the film in the camera.

An object of the present invention is to provide a novel camera attachment which is capable of actuating the film exposing mechanism of the camera, such attachment being capable of being controlled remotely by an operator who is located at a considerable distance from the camera.

Another object of this invention is to provide a novel camera attachment embodying a control mechanism which may be operated remotely by a person positioned in front of the camera, such control mechanism being arranged to operate the camera shutter operating means so the person may be photographed while he is positioned in front of the camera.

Other and further objects of my invention will be pointed out hereinafter, or will be indicated in the appended claims, or will be obvious to one skilled in the art upon an understanding of the present disclosure. For the purpose of this application, I have elected to show herein certain forms and details of a camera attachment which is representative of my invention; it is to be understood, however, that the embodiment of my invention herein shown and described, is for purposes of illustration only, and that therefore it is not to be regarded as exhaustive of the variations of the invention in the art.

Figure 1:
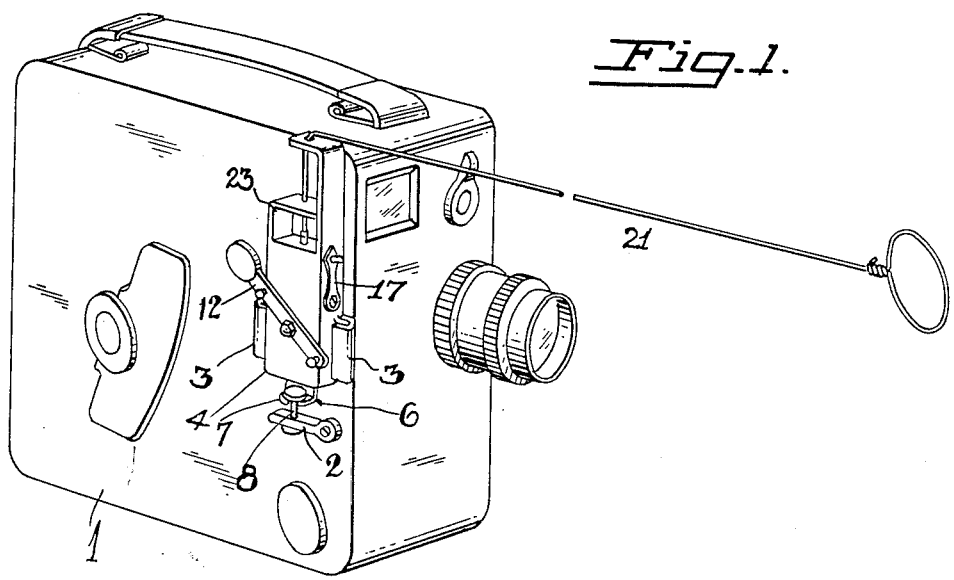
Figure 2:
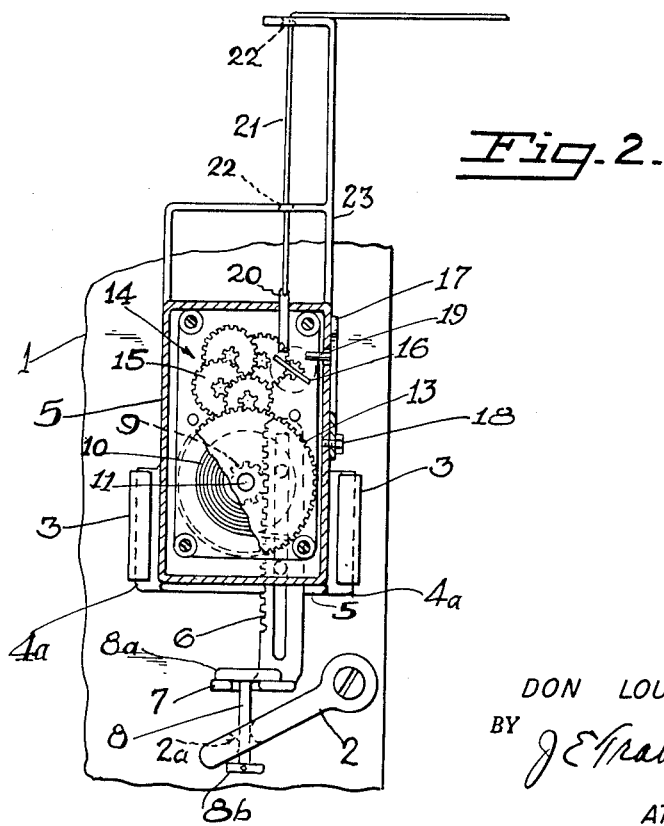

In the accompanying drawing:

Fig. 1 is a perspective view of a camera, showing my improved camera switch operating device mounted thereon; and Fig. 2 is an enlarged side view, showing the cover of the casing which houses the gear system removed, and showing also the internal operating mechanism diagrammatically Referring to the drawing, the numeral 1 designates a ciné camera of the type adapted to expose successively a number of frames of a motion picture film, or such camera might also be of the type which is capable of making one exposure at a time. The camera is provided with a pivoted switch arm 2 on one of its sides which connects with the usual internal mechanism that controls the synchronized operation of the camera shutter and film advancing means. In the event my invention is used with a still camera, the switch arm may embody a form adapted to operate the camera shutter. In either event the switch arm 2 may be considered generally as the element which when actuated will effect the exposure of the film in the camera.

Detachably supported on a side of the camera by means of two opposed bracket members 3 is a stationary casing 4. The bracket members 3 have opposed vertical open slots within which vertically extending protuberances 4a on the opposite lateral sides of the casing slidably fit. The casing may be supported by an underlying flange 5 secured to the bracket members, or by any other suitable means such as a close friction fit between the bracket members and the protuberances 4a.

Extending upwardly into the casing through a slot in the latter's lower side is an elongated rack 6 which is mounted for up and down reciprocating movement. The lower end of the rack is provided with an outwardly disposed bifurcated end member 7 which has an open slot within which a pin 8 is adapted to be positioned. The pin extends through a slot or opening 2a in the switch arm 2, and such pin has enlargements 8a and 8b on its upper and lower ends, respectively. The switch arm 2 is normally inclined when in an inactive or inoperative position, and when it is suitably swung upwardly, it releases the mechanism in the camera so the charged camera spring or the electrical means inside the camera starts and continues the synchronized operation of the camera shutter and the film advancing mechanism. The camera and its operating means are old in the art and a detailed description thereof is not necessary to an understanding of the present invention. Thus, when the rack 6 has reached a certain position in its upward reciprocating movement, the lower enlargement 8b of the pin 8 engages with the switch arm 2 and upon the rack moving upwardly to a further extent, it will swing the switch arm upwardly to cause the exposure of the film in the camera. It is to be noted that the enlargement 8a on the upper end of the pin 8 is wider than the slot of the bifurcated end member 7, while the enlargement 8b is larger in width than the opening 2a of the switch arm 2. It is to be noted that any suitable means such as that described or other mechanism may be used to connect the rack 6 with the switch arm 2 or its equivalent.

The teeth of the rack 6 engage with a small gear 9 which is rotated slowly by a source of power supplied by a coiled spring 10 when the latter is charged. The spring is connected in the usual manner to a main shaft 11 having the small gear 9 secured to one of its ends and a hand crank or winding key 12 to its other end. By turning the winding key 12 in a certain direction, the spring 10 is charged, and the rack 6 is moved downwardly. Keyed to the main shaft 11 is a large gear 13, and connected to the said large gear 13 by a train 14 of reduction gears 15 is a small disc-like impeller 16. Mounted on the side of the casing is an adjustable, swinging safety control arm 17 having one end pivotally mounted as at 18 on the casing and having an inwardly protruding pin 19 on its opposite end, the said pin extending through a slot in the casing. By manually swinging the control arm 17 in one direction, the pin 19 will engage with the rotating impeller 17 and prevent its rotation as well as the rotation of the gears of the train 14 and the shaft 11 and the small gear 9. By swinging the arm 17 in the opposite direction, the pin 19 is moved from engagement with the impeller 17, thereby making it possible for the rotation of the aforesaid various elements to commence, providing the spring 10 is then charged. Also extending through an opening in the upper side of the closing 4 is a retractable control member 20 which is mounted for up and down adjustment. When in its downward position, the control member 20 also is adapted to engage with and prevent the rotation of the impeller 16 and the aforesaid various rotatable elements connected thereto; and when in an upwardly adjusted position, the said control member is withdrawn from engagement with the impeller, thereby commencing the upward movement of the rack 6, providing the control arm 18 is then positioned with its pin 19 out of engagement with the said impeller. Connected to the upper end of the control member 20 is a flexible cord, string or wire 21 of suitable length which extends through openings 22 in a rigid superstructure 23 secured to and extending above the casing.

When a person wishes to photograph himself, he turns the winding key 12 until the spring 10 is charged and the rack 6 is moved to its downward position. The safety control arm 17 is then swung to a released position so the pin 19 is not engaging with the impeller 16, thereby making it possible to commence the upward movement of the rack by merely moving the control member 20 upwardly by means of a pull on the cord 21. The person being then positioned in a suitable position directly in front of the camera, pulls on the cord, thereupon releasing the control member 20 and commencing the upward movement of the rack 6, which upon moving upwardly for a predetermined distance will turn the camera's switch arm 2 to a position whereby the camera mechanism brings about the exposure of the film therein.

What I claim is:

1. In photographic apparatus for use with a camera of the type having an adjustable shutter control member mounted thereon and arranged to swing upwardly and downwardly, a casing detachably mounted on the camera above the shutter control member, an elongated vertically reciprocating rack extending downwardly through the bottom of the casing and arranged in connected relationship with the shutter control member, a main shaft mounted in the casing, a small gear connected to one end of the shaft, the said small gear being meshed with the teeth of the rack, a winding key secured to the other end of the shaft, a coiled tension spring connected to the shaft and arranged to be charged upon the rotation of the winding key and the shaft in a certain direction, the said shaft, small gear and rack being so arranged that the rack is extended downwardly from the casing when the shaft is turned to charge the spring, and the said rack being retracted upwardly when the spring rotates the shaft and small gear in the opposite direction, an impeller rotatably mounted adjacent two openings in the casing, a train of gears connecting the impeller and the shaft, a control arm adjustably mounted on the casing and carrying a member extending through one of the openings in the casing, the member being arranged to intercept and stop the rotation of the impeller when the control arm is in one of its adjusted positions, a second adjustable control member extending through the other opening in the casing and arranged to intercept the impeller when in one of its adjusted positions, the said second control member being constructed and arranged to be retracted from an intercepting position with respect to the impeller, and an elongated cord connected to the second control member, the said cord being arranged to retract the second control member when a pull is made thereon.

2. In photographic apparatus as set forth in claim 1 together with means detachably mounting the casing on the side of the camera.

No references cited.